US009197068B2

(12) United States Patent
Nuqui et al.

(10) Patent No.: US 9,197,068 B2
(45) Date of Patent: Nov. 24, 2015

(54) COORDINATED CONTROL OF MULTI-TERMINAL HVDC SYSTEMS

(75) Inventors: Reynaldo Nuqui, Cary, NC (US); Jiuping Pan, Raleigh, NC (US); Kailash Srivastava, Västerås (SE); Tomas Jonsson, Västerås (SE)

(73) Assignee: ABB Research Ltd., Zurich (CH)

(*) Notice: Subject to any disclaimer, the term of this patent is extended or adjusted under 35 U.S.C. 154(b) by 512 days.

(21) Appl. No.: 13/085,949

(22) Filed: Apr. 13, 2011

(65) Prior Publication Data

US 2012/0092904 A1  Apr. 19, 2012

Related U.S. Application Data

(60) Provisional application No. 61/388,403, filed on Sep. 30, 2010.

(51) Int. Cl.
*H02J 3/36* (2006.01)
*H02H 7/125* (2006.01)
(Continued)

(52) U.S. Cl.
CPC ... *H02J 3/36* (2013.01); *G06F 1/26* (2013.01); *H02H 7/125* (2013.01); *H02J 13/0062* (2013.01); *Y02E 60/60* (2013.01); *Y02E 60/7838* (2013.01); *Y04S 40/124* (2013.01)

(58) Field of Classification Search
CPC ........................................................ H02J 3/36
USPC ........... 363/33, 34, 35, 36, 37, 38, 39, 40, 55, 363/51, 120, 53, 65, 57, 58, 78, 79; 307/22, 307/82, 72, 35, 31
See application file for complete search history.

(56) References Cited

U.S. PATENT DOCUMENTS 4,106,085 A    8/1978  Demarest
4,210,956 A *  7/1980  watanabe ................. 363/51
(Continued)

FOREIGN PATENT DOCUMENTS

CN    101194404 A    6/2008
CN    201215900 Y    4/2009
(Continued)

OTHER PUBLICATIONS

A. Roider, International Searching Authority (EPO), International Search Report and Written Opinion of the International Searching Authority for corresponding International Application No. PCT/US2011/032301, European Patent Office, mailed Nov. 15, 2011.
(Continued)

*Primary Examiner* — Jue Zhang
*Assistant Examiner* — Trinh Dang
(74) *Attorney, Agent, or Firm* — Steven W. Hudnut

(57) ABSTRACT

Multi-terminal HVDC systems and control methods therefore are disclosed. Methods for controlling multi-terminal HVDC systems having a plurality of converter stations may include receiving a plurality of measurements from a plurality of measurement units disposed on the HVDC system, identifying from the measurements a disruption within the HVDC system, monitoring the measurements to identify a steady-state disrupted condition for the HVDC system, calculating a new set point for at least one of the plurality of converter stations, which new set point may be based on the steady-state disrupted condition and the measurements, and transmitting the new set point to the at least one of the plurality of converter stations. In some examples, the HVDC systems may include an HVDC grid interconnecting the plurality of converter stations and a controller communicatively linked to the plurality of measurement units and the plurality of converter stations.

26 Claims, 5 Drawing Sheets

(51) Int. Cl.
*G06F 1/26* (2006.01)
*H02J 13/00* (2006.01)

(56) References Cited

U.S. PATENT DOCUMENTS

| | | | |
|---|---|---|---|
| 4,263,517 A | 4/1981 | Konish |
| 4,274,043 A | 6/1981 | Heitz |
| 4,300,181 A | 11/1981 | Premerlani |
| 4,419,591 A | 12/1983 | Irokawa |
| 4,468,664 A | 8/1984 | Galvin |
| 4,517,635 A | 5/1985 | Kelley |
| 4,543,492 A | 9/1985 | Inokuchi |
| 4,646,299 A | 2/1987 | Schinabeck |
| 4,672,519 A | 6/1987 | Liss |
| 4,941,079 A | 7/1990 | Ooi |
| 4,947,110 A | 8/1990 | Laass |
| 5,049,809 A | 9/1991 | Wakatsuki |
| 5,345,375 A | 9/1994 | Mohan |
| 5,499,178 A | 3/1996 | Mohan |
| 5,517,422 A | 5/1996 | Ilic |
| 5,657,213 A | 8/1997 | Bjorklund |
| 5,694,306 A | 12/1997 | Bjorklund |
| 5,831,843 A | 11/1998 | Lindberg |
| 5,867,375 A | 2/1999 | Svensson |
| 5,870,293 A | 2/1999 | Svensson |
| 5,870,300 A | 2/1999 | Blidberg |
| 5,872,707 A | 2/1999 | Asplund |
| 5,896,285 A | 4/1999 | Ekwall |
| 5,901,053 A | 5/1999 | Eriksson |
| 5,910,888 A | 6/1999 | Weimers |
| 5,917,718 A | 6/1999 | Palsson |
| 5,969,956 A | 10/1999 | Nyberg |
| 5,980,095 A | 11/1999 | Asplund |
| 5,986,903 A | 11/1999 | Svensson |
| 5,991,181 A | 11/1999 | Fujii |
| 5,995,394 A | 11/1999 | Svensson |
| 5,999,388 A | 12/1999 | Asplund |
| 6,067,238 A | 5/2000 | Halvarsson |
| 6,093,041 A | 7/2000 | Kay |
| 6,144,567 A | 11/2000 | Asplund |
| 6,196,869 B1 | 3/2001 | Kay |
| 6,259,616 B1 | 7/2001 | Ekwall |
| 6,278,314 B1 | 8/2001 | Asplund |
| 6,282,265 B1 | 8/2001 | Lowell |
| 6,400,585 B2 | 6/2002 | Jiang-Hafner |
| 6,411,066 B1 | 6/2002 | Jiang-Hafner |
| 6,411,067 B1 | 6/2002 | Bjorklund |
| 6,411,529 B1 | 6/2002 | Svensson |
| 6,479,907 B1 | 11/2002 | Eriksson |
| 6,480,403 B1 | 11/2002 | Bijlenga |
| 6,519,169 B1 | 2/2003 | Asplund |
| 6,587,362 B1 | 7/2003 | Vithayathil |
| 6,611,441 B2 * | 8/2003 | Kurokami et al. ........ 363/56.02 |
| 6,670,721 B2 | 12/2003 | Lof |
| 6,898,095 B2 | 5/2005 | Bijlenga |
| 6,963,187 B2 | 11/2005 | Bebic |
| 6,984,962 B2 | 1/2006 | Angquist |
| 6,995,994 B2 | 2/2006 | Bijlenga |
| 7,005,739 B2 | 2/2006 | Kaufman |
| 7,203,622 B2 | 4/2007 | Pan |
| 7,206,211 B2 | 4/2007 | Blidberg |
| 7,239,535 B2 | 7/2007 | Siljestrom |
| 7,321,500 B2 | 1/2008 | Asplund |
| 7,411,797 B2 | 8/2008 | Norrga |
| 7,518,266 B2 | 4/2009 | Eckroad |
| 7,689,323 B2 | 3/2010 | Mansingh |
| 7,729,142 B2 | 6/2010 | Karlecik-Maier |
| 9,007,733 B2 | 4/2015 | Wang |
| 9,042,071 B2 | 5/2015 | Berggren |
| 2002/0024828 A1 * | 2/2002 | Hayashi et al. ........ 363/35 |
| 2002/0087234 A1 | 7/2002 | Lof |
| 2002/0103745 A1 | 8/2002 | Lof |
| 2003/0006613 A1 | 1/2003 | Lof |
| 2003/0011348 A1 | 1/2003 | Lof |
| 2003/0098672 A1 | 5/2003 | Wernersson |
| 2003/0126060 A1 | 7/2003 | Lof |
| 2003/0185665 A1 | 10/2003 | Hansen |
| 2003/0226373 A1 | 12/2003 | Prible |
| 2004/0052015 A1 | 3/2004 | Angquist |
| 2004/0052023 A1 | 3/2004 | Asplund |
| 2004/0057261 A1 | 3/2004 | Norrga |
| 2004/0120166 A1 | 6/2004 | Bijlenga |
| 2004/0207070 A1 | 10/2004 | Kaufmann |
| 2004/0218318 A1 | 11/2004 | Bijlenga |
| 2004/0239298 A1 | 12/2004 | Norrga |
| 2004/0240240 A1 | 12/2004 | Bijlenga |
| 2004/0246746 A1 | 12/2004 | Norrga |
| 2004/0246756 A1 | 12/2004 | Bijlenga |
| 2005/0063124 A1 | 3/2005 | Lundberg |
| 2005/0127680 A1 | 6/2005 | Lof |
| 2006/0044849 A1 | 3/2006 | Siljestrom |
| 2006/0056209 A1 | 3/2006 | Blidberg |
| 2006/0118816 A1 | 6/2006 | Gunturi |
| 2006/0256587 A1 | 11/2006 | Asplund |
| 2006/0282239 A1 | 12/2006 | Chu |
| 2007/0114978 A1 | 5/2007 | Lindahl |
| 2008/0007973 A1 | 1/2008 | Schreiber |
| 2008/0103630 A1 | 5/2008 | Eckroad |
| 2008/0177425 A1 | 7/2008 | Korba |
| 2008/0205093 A1 | 8/2008 | Davies |
| 2008/0251424 A1 | 10/2008 | Dahlund |
| 2008/0252142 A1 | 10/2008 | Davies |
| 2008/0296045 A1 | 12/2008 | Pettersson |
| 2008/0319893 A1 | 12/2008 | Mashinsky |
| 2009/0080225 A1 | 3/2009 | Dijkhuizen |
| 2009/0108973 A1 | 4/2009 | Berglund |
| 2009/0126965 A1 | 5/2009 | Astrom |
| 2009/0168468 A1 | 7/2009 | Radbrant |
| 2009/0168473 A1 | 7/2009 | Karlsson |
| 2009/0201702 A1 | 8/2009 | Radbrant |
| 2009/0218208 A1 | 9/2009 | Astrom |
| 2009/0219737 A1 | 9/2009 | Bjorklund |
| 2009/0266600 A1 | 10/2009 | Tornkvist |
| 2009/0266605 A1 | 10/2009 | Ming |
| 2009/0279328 A1 * | 11/2009 | Jiang-Hafner ........ 363/35 |
| 2009/0295225 A1 | 12/2009 | Asplund |
| 2009/0301747 A1 | 12/2009 | Asplund |
| 2009/0303758 A1 | 12/2009 | Hedblad |
| 2009/0303759 A1 | 12/2009 | Petersson |
| 2009/0303761 A1 | 12/2009 | Radbrant |
| 2009/0316446 A1 | 12/2009 | Astrom |
| 2010/0002408 A1 | 1/2010 | Andersson |
| 2010/0008111 A1 | 1/2010 | Petersson |
| 2010/0014337 A1 | 1/2010 | Halvarsson |
| 2010/0014338 A1 | 1/2010 | Jacobson |
| 2010/0019717 A1 | 1/2010 | Bjerknes |
| 2010/0046255 A1 | 2/2010 | Paajarvi |
| 2010/0051306 A1 | 3/2010 | Tornkvist |
| 2010/0053830 A1 | 3/2010 | Andersson |
| 2010/0085783 A1 | 4/2010 | Jiang-Hafner |
| 2010/0091527 A1 | 4/2010 | Asplund |
| 2010/0091528 A1 | 4/2010 | Radbrandt |
| 2010/0094477 A1 | 4/2010 | Berggren |
| 2010/0117776 A1 | 5/2010 | Tampe |
| 2010/0139974 A1 | 6/2010 | Christen |
| 2010/0150175 A1 | 6/2010 | Bjorklund |
| 2010/0157633 A1 | 6/2010 | Bjorklund |
| 2010/0158001 A1 | 6/2010 | Bjorklund |
| 2013/0278078 A1 | 10/2013 | Ohlsson |
| 2014/0268942 A1 | 9/2014 | Häfner |
| 2014/0313628 A1 | 10/2014 | Häfner |

FOREIGN PATENT DOCUMENTS

| | | |
|---|---|---|
| CN | 101479910 A | 7/2009 |
| WO | 2006131017 A2 | 12/2006 |
| WO | 2008000626 A1 | 1/2008 |

OTHER PUBLICATIONS

J. Beerten, S. Cole and R. Belman, "A Sequential AC/DC power flow algorithm for networks containing Multi-terminal VSC HVDC systems," Power and Energy Society General Meeting, 2010. IEEE, pp. 1-7, Jul. 25, 2010.

(56) References Cited

OTHER PUBLICATIONS

K. Narendra and H. Chandrasekharaiah, "Electric pollution studies in mesh type MTDC system using neural network," Proceedings of the Second International Forum on Applications of Neural Networks to Power Systems, 1993. ANNPS '93., Yokahoma, Japan, Apr. 19-22, 1993, IEEE, pp. 355-360, Apr. 9, 1993.

Aredes, R. F. S. Dias, A. F. C. Aquino, C. Portela and E. H. Watanabe, "Power electronics applications in bulk power transmission over long distances," International Symposium on Industrial Electronics (ISIE), 2010 IEEE, pp. 3757-3765, Jul. 4, 2010.

L. Xu, L. Yao and M. Bazargan, "DC grid management of a multi-terminal HVDC transmission system for large offshore wind farms," International Conference on Sustainable Power Generation and Supply, 2009, Supergen '09, pp. 1-7, Apr. 6, 2009.

Zhang, et al., "Flexible AC Transmission Systems: Modelling and Control," 2006, pp. 1, 82-95 and 122-127, Springer-Verlag Berlin Heidelberg, Germany.

Angeles-Comancho, et al., "Inclusion of high voltage DC-voltage source converter model in a Newton-Raphson power flow algorithm," IEEE Proc.—Generation Transmission Distribution, vol. 150, No. 6., Nov. 2003.

European Patent Office, Communication pursuant to Rules 161 (1) and 162 EPC in corresponding European Application No. 11717093.6, May 8, 2013.

F. Postiglione, Reply to May 8, 2013 Communication pursuant to Rules 161 (1) and 162 EPC in corresponding European Application No. 11717093.6, Nov. 6, 2013.

C. M. Franck, "HVDC Circuit Breakers: A Review Identifying Future Research Needs," IEEE Transactions on Power Delivery, vol. 26, No. 2, Apr. 2011.

"ABB solves 100-year-old electrical puzzle—new technology to enable future DC grid," Nov. 7, 2012, Zurich, Switzerland, printed Jul. 3, 2015 from http://www.abb.com/cawp/seitp202/65df338284e41b3dc1257aae0045b7de.aspx.

The State Intellectual Property Office of the People's Republic of China, Office Action for corresponding Chinese patent application No. 201180045622.0, Nov. 24, 2014.

Steven Hudnut, Instructions and Claims for Response to Office Action issued Nov. 24, 2014 for corresponding Chinese patent application No. 201180045622.0, Jun. 4, 2015.

\* cited by examiner

COORDINATED CONTROL OF MULTI-TERMINAL HVDC SYSTEMS

CROSS REFERENCE TO RELATED APPLICATION(S)

This application claims the benefit of and priority to U.S. Provisional Patent Application Ser. No. 61/388,403, which was filed on Sep. 30, 2010 and is entitled "COORDINATED CONTROL OF MULTI-TERMINAL HVDC SYSTEMS." The complete disclosure of the above-identified patent application is hereby incorporated by reference for all purposes.

FIELD OF THE DISCLOSURE

The present disclosure relates to high-voltage, direct current (HVDC) systems, and more particularly to systems and methods for controlling multi-terminal HVDC systems that include a plurality of converter stations.

BACKGROUND

In response to a disruption or disturbance in an HVDC system, it may be necessary to isolate some equipment, such as cables, overhead lines and/or converter stations. The resulting outage(s) may or may not impact the operation of the HVDC system. If the operation is impacted, the HVDC system needs to be moved from an unstable, uneconomical and/or emergency operating point to a stable, economical and non-emergency operating point. The converter station local controls may attempt to restore the power balance in the direct current (DC) grid by changing the DC voltages to achieve a power balance in the lines terminating in the converter station. However, these uncoordinated actions, which are based on local measurements at the converter stations, might not drive system voltages to nominal levels. Rather, the combined individual actions of the converter station local controls might cause the HVDC system to experience prolonged operation at voltages above or below nominal, which may be unstable, uneconomical and/or detrimental to the security of the DC grid.

Examples of HVDC systems, and methods and systems for controlling HVDC systems, are disclosed in U.S. Pat. Nos. 4,419,591; 6,400,585 and 7,729,142, and in U.S. Patent Application Pub. Nos. 2006/0282239 and 2009/0279328. Examples of multi-terminal HVDC systems are disclosed in U.S. Pat. Nos. 4,419,591 and 7,729,142. The disclosures of these and all other publications referenced herein are incorporated by reference in their entirety for all purposes.

SUMMARY

In some examples, methods for controlling multi-terminal HVDC systems having a plurality of converter stations may include receiving a plurality of measurements from a plurality of measurement units disposed on the HVDC system, identifying from the measurements a disruption within the HVDC system, monitoring the measurements to identify a steady-state disrupted condition for the HVDC system, calculating a new set point for at least one of the plurality of converter stations, and transmitting the new set point to the at least one of the plurality of converter stations. The new set point may be based on the steady-state disrupted condition and the measurements.

In some examples, a computer readable storage medium may have embodied thereon a plurality of machine-readable instructions configured to be executed by a computer processor to control multi-terminal HVDC systems having a plurality of converter stations. The plurality of machine-readable instructions may include instructions to receive a plurality of measurements from a plurality of measurement units disposed on the HVDC system, instructions to identify from the measurements a disturbance within the HVDC system, instructions to monitor the measurements to identify a steady-state disturbed condition for the HVDC system, instructions to calculate a new set point for at least one of the plurality of converter stations, which new set point may be based on the steady-state disturbed condition and the measurements, and instructions to transmit the new set point to the at least one of the plurality of converter stations.

In some examples, multi-terminal HVDC systems may include a plurality of converter stations, an HVDC grid interconnecting the plurality of converter stations, a plurality of measurement units disposed within the HVDC system, and a controller communicatively linked to the plurality of measurement units and the plurality of converter stations. The measurement units may be configured to obtain a plurality of time-tagged measurements from the HVDC system. The controller may be configured execute instructions to receive the measurements from the plurality of measurement units, identify from the measurements an outage within the HVDC system, monitor the measurements to identify a steady-state outaged condition for the HVDC system, calculate a new set point for at least one of the plurality of converter stations, which new set point may be based on the steady-state outaged condition and the measurements, and transmit the new set point to the at least one of the plurality of converter stations.

DETAILED DESCRIPTION

Figure 1:
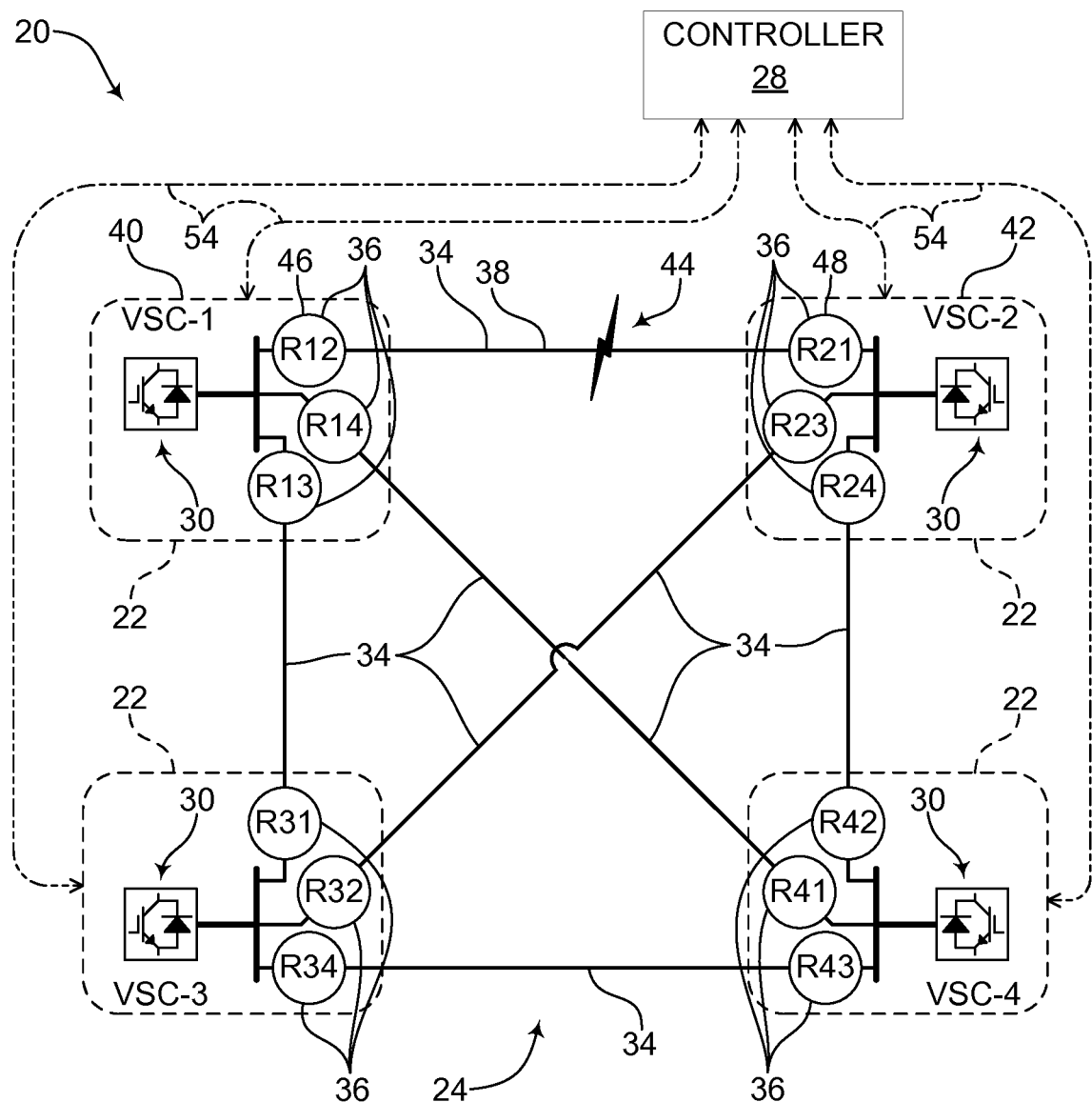
FIG. 1 is a simplified single line and block diagram schematic illustration of a representative HVDC system, with the protective DC relays shown.
Figure 2:
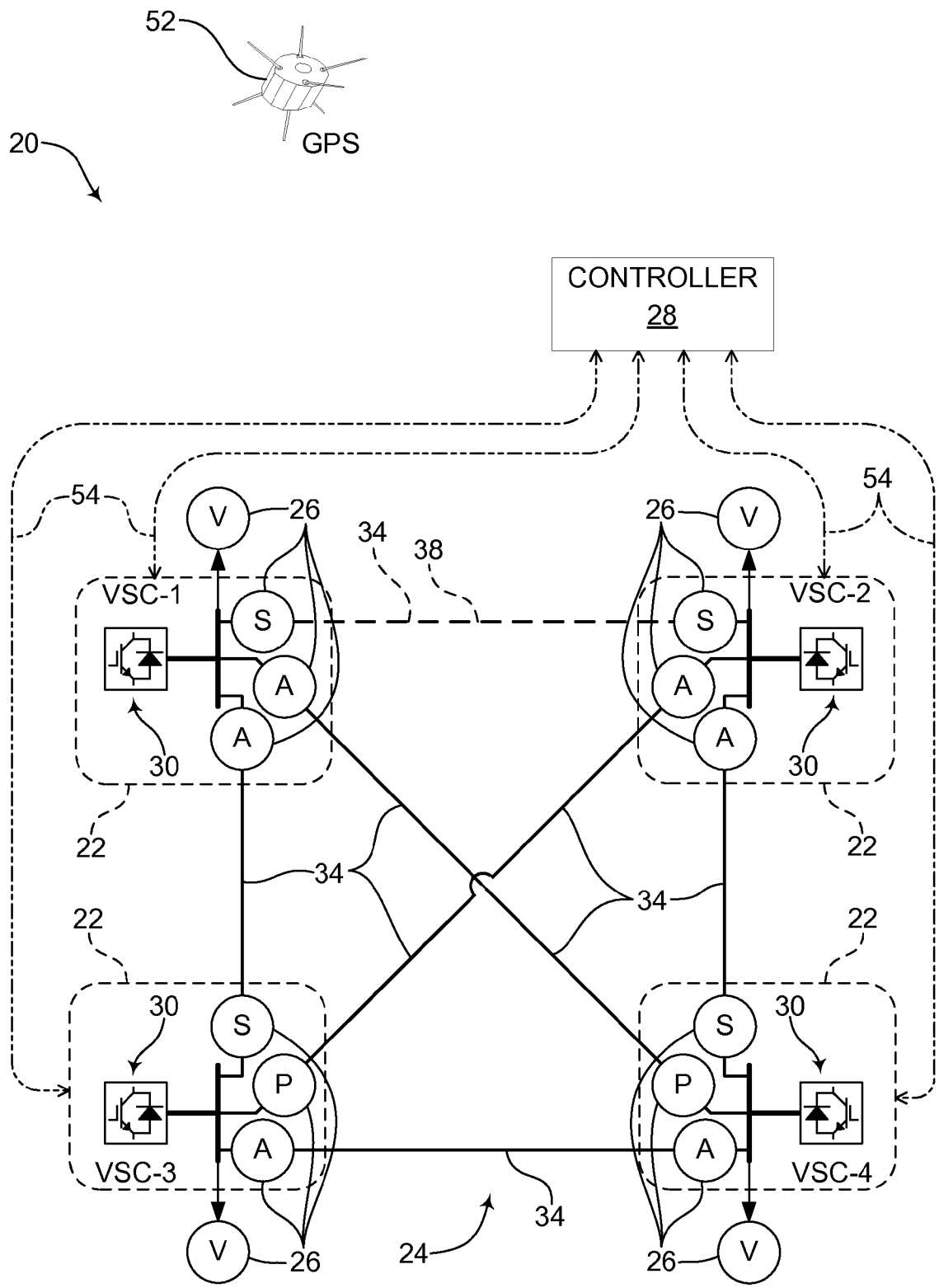
FIG. 2 is another simplified single line and block diagram schematic illustration of the representative HVDC system of FIG. 1, shown with examples of possible measurements.

A representative example of a multi-terminal HVDC system suitable for use with the methods disclosed herein is shown generally at 20 in FIGS. 1 and 2. Unless otherwise specified, the HVDC system 20 may, but is not required to, contain at least one of the structure, components, functionality, and/or variations described, illustrated, and/or incorporated herein. The HVDC system 20 includes a plurality of converter stations 22, an HVDC grid 24, a plurality of measurement units 26 (shown in FIG. 2) disposed on or within the HVDC system 20, and a controller 28.

The converter stations 22 may include any suitable converter 30 for converting alternating current (AC) power to DC power and/or for converting DC power to AC power. In the converter stations 22 illustrated in FIGS. 1 and 2, the converter 30 is a voltage source converter (VSC), such that the HVDC system 20 may be classified as a VSC-based or driven HVDC system (VSC-HVDC).

A VSC may include, by way of example, two three-phase groups of semiconductor valves in a six-pulse bridge connection. The semiconductor valves may include branches of gate turn on/turn off semiconductor elements, such as insulated gate bipolar transistors (IGBTs), and diodes in anti-parallel connection with these elements. Additional discussion regarding the details of VSCs is found in U.S. Pat. No. 6,259,616, the entire disclosure of which is incorporated by reference for all purposes. In some examples, the converter stations 22 may alternatively or additionally include other types of converters, such as a current source converter (CSC) or other type of converter. As shown in FIGS. 1 and 2, the illustrated HVDC system includes four converter stations 22. However, the systems and methods disclosed herein are also applicable to HVDC systems having two, three, five or even more converter stations.

The HVDC grid 24, which interconnects the plurality of converter stations 22, may include at least one cable circuit or HVDC transmission line 34. In the example illustrated in FIGS. 1 and 2, the HVDC grid 24 includes six HVDC transmission lines interconnecting the four converter stations 22 by way of the illustrated topology. In some examples, the HVDC grid 24 and the HVDC transmission lines 34 may be or include any suitable combination of direct current cables, direct current overhead lines, direct current cables and direct current overhead lines connected in series, direct current fault-current limiting reactors, or the like.

Some examples of HVDC systems may include at least one switch associated with at least one of the HVDC transmission lines and/or at least one of the converter stations. As shown in FIG. 1, each of the converter stations 22 of the HVDC system 20 includes a switch 36 associated with each of the HVDC transmission lines 34 extending from that converter station. The switches may be any suitable current interrupting device, such as a DC circuit or line breaker. With respect to FIG. 1, each of the HVDC transmission lines 34 is shown to be protected from faults by a pair of the switches 36 located at the ends of the transmission line. For example, the HVDC transmission line 38 between the first and second ones 40, 42 of the converter stations 22 is protected from a fault 44 thereon by a pair of protective relays 46, 48. In particular, in response to the fault 44, which may be a pole-to-pole or pole-to-ground fault, the relays 46 and 48 will trip and isolate the transmission line 38, such that the HVDC system 20 will be in the condition illustrated in FIG. 2, with the transmission line 38 being isolated. It should be understood that the number and locations of switches 36 illustrated in FIG. 1 on the HVDC system 20 are for purposes of illustration only, and the HVDC power system 20 may include any suitable number of switches, which may be disposed in any suitable locations.

The plurality of measurement units 26 are configured to obtain a plurality of measurements from the HVDC system 20 and transmit the measurements to the controller 28. As shown in FIG. 2, at least some of the plurality of measurement units 26 may be disposed within or linked to the converter stations 22. Nonexclusive illustrative examples of the measurements that may be obtained by the plurality of measurement units 26, and transmitted to the controller 28, include discrete value measurements, such as line breaker or converter station switch status information, as well as continuous measurements, such as converter station DC busbar voltages, DC cable currents, power flows, and DC power output from the converter stations. The power flows measured within the HVDC system may include power flows within the DC grid, DC power flows within or into the cables or transmission lines 38, power flows between at least two of the converter stations 22, and power flows within, across or through one of the converter stations 22, which may include variable power losses in at least one of the converter stations. For purposes of illustration, the measurement units 26 illustrated in FIG. 2 are identified by type, with cable current measurement units being identified by "A," cable power measurement units being identified by "P," converter station DC busbar voltage measurement units being identified by "V," and discrete value measurement units, such as line breaker status value measurement units, being identified by "S." However, it should be understood that the particular types, location and combination of measurement units shown in FIG. 2 are for purposes of illustration only, and the HVDC power system 20, the converter stations 22, and/or the various ones of the transmission lines 38 may be provided with any suitable number, type, location or combination of measurement units.

In some examples, the measurements may be time synchronized. For example, the measurements may be marked or provided with a suitable time stamp, which may allow later time-aligning or time-synchronizing of the measurements by the controller. By way of nonexclusive illustrative example, each of the measurement units 26 may time-tag or synchronize the measurements using a suitable time signal, such as network-based time synchronization signal produced within the HVDC system or a signal based on a GPS time signal, which may be received from a GPS satellite 52.

The controller 28, as suggested in FIGS. 1 and 2, is communicatively linked to the plurality of converter stations 22 by way of suitable communication links or pathways 54. In some examples, two or more of the converter stations may be linked to one another by way of suitable communication links or pathways. The plurality of measurement units 26, as suggested in FIGS. 1 and 2, are also communicatively linked to the controller 28 by way of suitable links or pathways, which may, in some examples, correspond to the communication pathways 54 linking the controller to the converter stations. Accordingly, the measurements are sent from or transmitted by the measurement units 26 and received by the controller 28 over suitable communication links or pathways. Furthermore, as will be more fully discussed below, control signals, such as set point information, are sent or transmitted from the controller 28 to the converter stations 22. Nonexclusive illustrative examples of suitable communication pathways 54 linking the controller 28 to the converter stations 22 and/or the measurement units 26 may include wired, fiber optic, radio-frequency wireless, microwave, power-line carrier, satellite, telephone, cellular telephone, an Ethernet, the internet, or any suitable wide area communication system.

The following paragraphs describe nonexclusive illustrative examples of methods for controlling multi-terminal HVDC systems having a plurality of converter stations, using the concepts and components discussed above. Although the actions of the following methods may be performed in the order in which they are presented below, it is within the scope of this disclosure for the following actions, either alone or in various combinations, to be performed before and/or after any of the other following actions. A method for controlling a multi-terminal HVDC system having a plurality of converter stations, which may be at least partially carried out by the controller 28 as a processor therein executes instructions, may generally include the controller 28 receiving a plurality of measurements sent from the plurality of measurement units 26, the controller 28 identifying from the measurements a disruption, such as a disturbance or outage, within the HVDC system 20, the controller 28 monitoring the measurements to identify a steady-state disrupted condition for the HVDC system 20, the controller 28 calculating new set points for at least some of the plurality of converter stations 22, and the controller 28 sending or transmitting the new set points to the converter stations 22.

Figure 3:
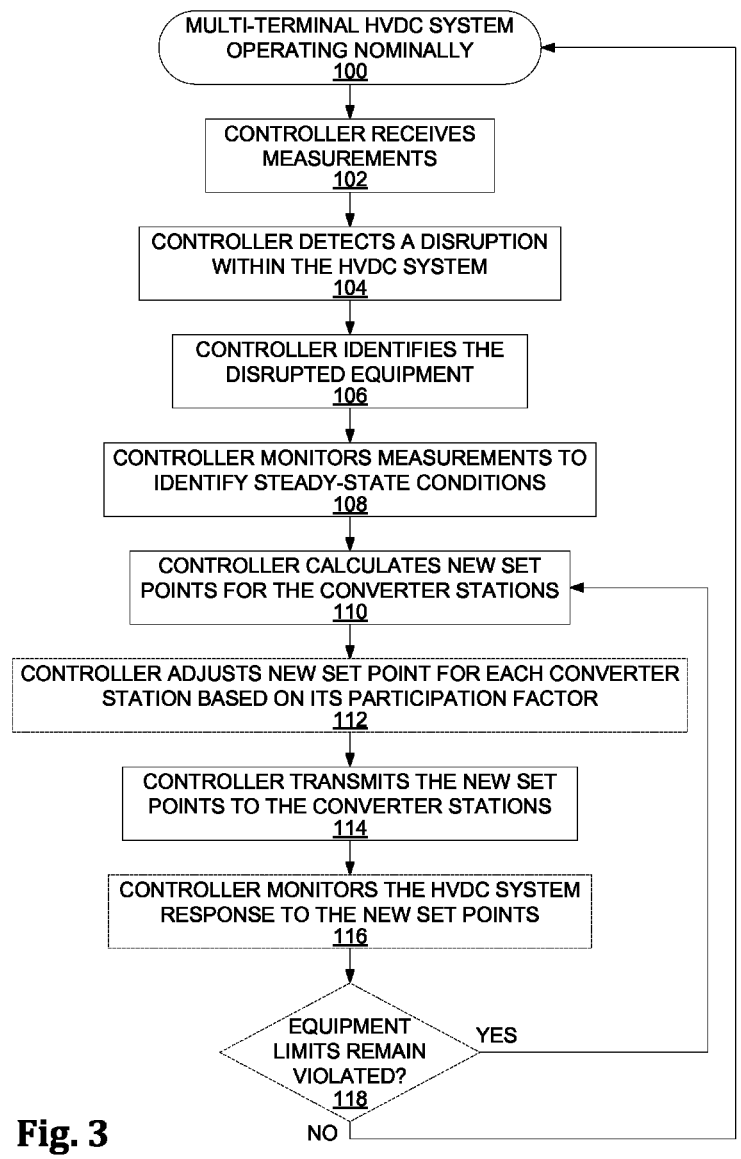
FIG. 3 is a flow chart of a nonexclusive illustrative example of a method for controlling a multi-terminal HVDC system having a plurality of converter stations, such as the HVDC system of FIG. 1.
Figure 4:
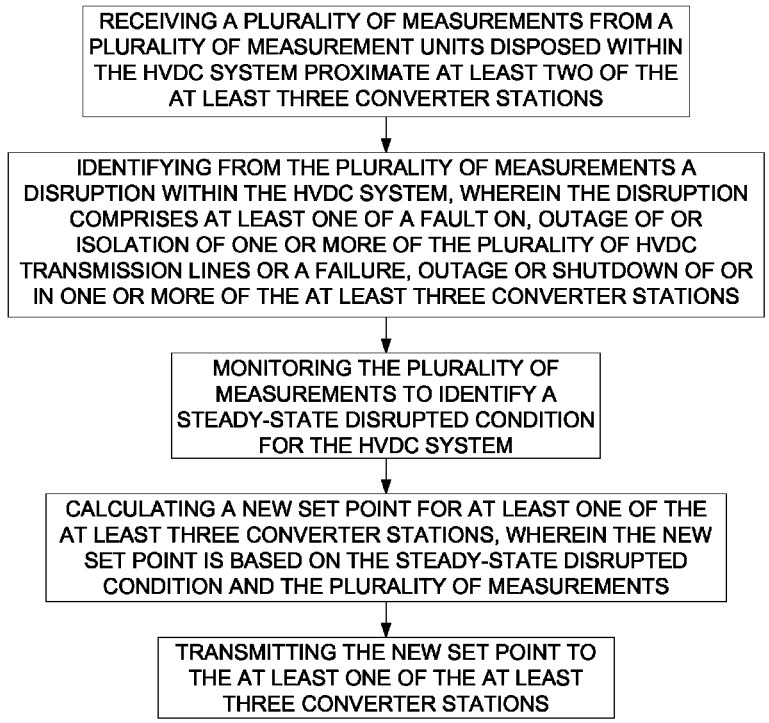
FIG. 4 is a flow chart of another nonexclusive illustrative example of a method for controlling a multi-terminal HVDC system having a plurality of converter stations, such as the HVDC system of FIG. 1.

A nonexclusive illustrative example of such methods is discussed below with regard to the flow chart shown in FIG. 3. At block 100, the multi-terminal HVDC system 20 is operating nominally. By nominally, it may be said the that HVDC system is operating normally, with no equipment outages, no equipment limits violated, and in some examples, at a stable, economical and non-emergency operating point. However, the HVDC system may also be operating nominally after a disruption, such as with one or more faulted or isolated components, few or no equipment limits violated, and with the system operating at a stable, economical and non-emergency operating point in view of the disruption.

At block 102, the controller 28 receives measurements from the measurement units 26, such as via the communication pathways 54 illustrated in FIGS. 1 and 2. As noted above, in some examples, the measurements may be time-aligned upon or after receipt from the measurement units. For example, after receiving the measurements, the controller 28, or another piece of equipment within the HVDC system, may time synchronize the measurements by aligning the time-tagged measurement data.

As noted above, the controller 28 may identify from the measurements a disruption, such as a disturbance or outage, within the HVDC system 20. Nonexclusive illustrative examples of disruptions may include: a fault on one or more of the transmission lines within the DC grid; one or more of the transmission lines or other equipment of the DC grid having an outage or being isolated, such as in response to a fault; a failure or shutdown of one or more of the converter stations; and an outage of switchgear components in a converter station, such as DC circuit breaker failure, current limiting reactor failure and/or busbar short circuit. As part of identifying a disruption within the HVDC system, the controller 28 may detect a disruption, such as a fault or equipment outage, within the HVDC system 20, as indicated at block 104, and the controller 28 may identify the disrupted equipment, as indicated at block 106.

In some examples, the controller 28 may identify the disrupted or outaged equipment using switch information. For example, the controller 28 may monitor the status of some or all of the switching equipment in the HVDC system 20, which may include at least DC breakers, and continuously perform a topology processing that identifies the presence of an outage in the HVDC grid.

At block 108, the controller 28 monitors measurements to identify a steady-state disrupted condition for the HVDC system 20. In some examples, the controller 28 may monitor a power flow within the HVDC system, such as between two or more of the converter stations 22, and identify the steady-state disrupted condition based on the monitored power flow. For example, the controller may monitor oscillations in the power flow and identify a steady-state condition when the power flow oscillations have negligible magnitudes and/or frequencies.

In some examples, rather than continuously performing all aspects of the disclosed method on an HVDC system, which may be operating in a transient or variable condition, the controller 28 may monitor the measurements to identify or detect commencement of a post-transient operating condition; that is, where the HVDC system 20 has stabilized into a disrupted, albeit steady-state, operating condition. Thus, although the controller 28 may monitor measurements, such as the power flows in the HVDC grid, during the transient as well as post transient time frame, such as in response to a topology change, the entire method may only be performed when the HVDC system is operating in a non-steady-state or transient condition.

At block 110, the controller 28 calculates a new set point for at least one of the of converter stations 22 or, in some examples, for each of the converter stations. For example, the controller 28 may calculate the desired real power, reactive power and/or DC voltage set point for at least one of the converter stations 22 based on measurements of power flows and voltage in the HVDC system 20. In some examples, at least some of the new set points are based on measurements taken when the system has stabilized into a disrupted, albeit steady-state, operating condition; based on the steady-state topology of the system; and/or based on reliability, stability and economic factors for the HVDC system and/or its components.

In some examples, the controller 28 may calculate new set points for at least some of the converter stations based on optimal power flow (OPF) techniques, which seek to optimize a global objective by acting on the controllable parameters of various power system equipment. As used herein, optimal power flow may refer to any optimal power flow within the HVDC system, and may include any combination of an optimal power flow determined within the HVDC grid, an optimal power flow determined between two or more converter stations and/or an optimal power flow determined through or across any one or more converter stations. In some examples, an optimal power flow may be determined based on variable power losses in at least one of the converter stations. Thus, the new set points may be calculated and/or adjusted based on, or according to, an optimal power flow that has been determined for or within the HVDC system.

The OPF technique is based on solving an optimal power flow problem, which is classically formulated as an optimization problem in the form of equation (1).

$$\min f(x,u)$$
$$\text{subject to } g(x,y)=0 \quad (1)$$
$$h(x,y) \leq 0$$

where $f(x,u)$ is the objective function, $g(x,y)$ are the equality constraints, and $h(x,y)$ are the inequality constraints. The vector x contains the voltages and angles of all buses and the vector u contains the set of controllable variables. The vector y is composed of both scheduled p and controllable variables u and is written as:

$$y=[u\ p]^T \quad (2)$$

The equality constraints $g(x,y)$ include the power flow equations. The inequality constraints $h(x,y)$ include bounds in operational ratings of equipment, such as bus voltage limits, branch flow limits, generation limits, or the like. The set of control variables may include AC system generator voltage, AC system LTC (Load Tap Changer transformer) tap position, AC system phase shifter angle, AC system SVC (Static VAR Compensator) variables, load shedding, DC line flow, or the like.

The power flow equations of a multi-terminal VSC-HVDC link may be expressed in the form $g^{VSC\text{-}HVDC}=0$, as set out in equation (3), where the new state vector x includes the DC bus voltages.

$$g^{VSC\text{-}HVDC}(x,y) = \begin{cases} P_{AC}(x,y) - P_{AC}^{sched} \\ Q_{AC}(x,y) - Q_{AC}^{sched} \\ I_{DC}(x,y) - Y_{DC}V_{DC} \end{cases} \quad (3)$$

The controlled variables of the multi-terminal VSC-HVDC link may be expressed in the form $h^{VSC\text{-}HVDC} \leq 0$ and would normally include limits on the bus voltages and converter maximum P and Q limits, as set out in equation (4).

$$h^{VSC\text{-}HVDC}(x,y) = \begin{cases} |V_{AC,i}| \leq |V_{AC,i}|^{upper} \\ |V_{AC,i}|^{lower} \leq |V_{AC,i}| \\ P_{AC,i} \leq P_{AC,i}^{upper} \\ P_{AC,i}^{lower} \leq P_{AC,i} \\ Q_{AC,i} \leq Q_{AC,i}^{upper} \\ Q_{AC,i}^{lower} \leq Q_{AC,i} \\ |V_{DC,k}| \leq |V_{DC,k}|^{upper} \\ |V_{DC,k}|^{lower} \leq |V_{DC,k}| \\ P_{DC,m} \leq P_{DC,m}^{upper} \\ P_{DC,m}^{lower} \leq P_{DC,m} \end{cases} \quad (4)$$

where $V_{AC,i}$ is the bus voltage on the AC-side of a VSC converter station i, for i=1 ... N, with N being the number of VSC converter stations; $P_{AC,i}$ is the real power injection from the AC system into the VSC converter station i; $Q_{AC,i}$ is the imaginary power injection from the AC system into the VSC converter station i; $V_{DC,k}$ is the DC-side bus voltage at the k-th DC busbar, for k=1 ... K, with K being the number of controllable nodes or branches in the DC grid; and $P_{DC,m}$ is the DC-side real power at the m-th branch in the DC grid, for m=1 ... M, with M being the number of controllable branches in the DC grid.

In the general case, the control vector $u^{VSC\text{-}HVDC}$ may be expressed as in equation (5).

$$u^{VSC\text{-}HVDC} = \begin{bmatrix} P_{AC,i} \\ Q_{AC,i} \\ V_{AC,i} \\ P_{AC,i} \\ Q_{AC,i} \\ V_{DC,k} \end{bmatrix} \quad (5)$$

However, various control philosophies, which may involve control of single or multiple parameters, could be included and/or enabled in a multi-terminal VSC-HVDC link. For example, one control implementation sets the DC-side voltage for one converter station, while setting the real and reactive power flow orders at the rest of converter stations, resulting in a control vector as in equation (6).

$$u^{VSC\text{-}HVDC} = \begin{bmatrix} P_{AC,i} \\ Q_{AC,i} \\ V_{DC,K} \end{bmatrix}, i = 1, \ldots N, i \neq K \quad (6)$$

In particular, one VSC converter station, K, has its DC bus voltage $V_{DC,k}$ controlled, while the rest of the VSC converter stations, i=1, ... N, i≠K, have their real and reactive power injections $P_{AC,i}$, $Q_{Ac,i}$ controlled.

Accordingly, the optimal power flow problem for the multi-terminal VSC-HVDC link may be expressed as in equation (7).

$$\min f(x,u)$$

$$\text{subject to } [g(x,y) g^{VSC\text{-}HVDC}(x,y)]^T = 0 \quad (7)$$

$$[h(x,y) h^{VSC\text{-}HVDC}(x,y)]^T \leq 0$$

In some examples, as indicated at block 112, the controller 28 may adjust at least some of the new set points based on a participation factor for at least one of the converter stations 22. In particular, the controller 28 may adjust the new set point for a particular converter station based on a participation factor assigned to, or associated with, that converter station. As used herein, "participation factor" refers to the degree of participation of a given converter to the required power change for the HVDC system, such as in response to a disruption or equipment outage, such as an outage of one or more of the HVDC transmission lines or converter stations. In some examples, the participation factor for a particular converter station may correspond to the desired percentage pickup of the total change, such that the participation factors for all included converter stations add up to 100% for the entire system.

Adjustments based on participation factors may be useful in situations such as where energy prices are set for each of the converter stations. For example, the converter stations may be electricity market players such that set point adjustments based on participation factors may be used to move the overall system towards a more economical operating point.

In some examples, the set points may be adjusted based on the OPF techniques set out above. For example, the set points may be adjusted such that converter participation, or the amount of change in an existing converter power set point, accounts for any losses within the converters.

At block 114, the controller 28 transmits, sends or dispatches the calculated new set points to the corresponding converter stations 22, such as via the communication pathways 54 illustrated in FIGS. 1 and 2. In some examples, the new set points may be transmitted in the form of power orders or control signals. Based on the new set points, the converter station controllers may then implement appropriate control actions, such as by setting the real power, the reactive power and/or the DC voltage for the converter station.

In some examples, as indicated at block 116, the controller 28 may monitor the response of the HVDC system 20 to the new set points or power orders. In particular, the controller 28 may monitor the measurements to determine from the measurements a system response to the new set points.

The controller 28 may monitor the system response to the new set points to determine, as indicated at block 118, whether the system response either violates at least one equipment rating or limit for the HVDC system or has not cleared an equipment limit violation. Nonexclusive illustrative examples of equipment limit violations may include thermal overloads of converters or transmission lines, abnormal voltages, such as undervoltage in converters, and/or excessive current or power flows.

If any equipment limits for the HVDC system remain violated, the controller returns to block 110 and recalculates and/or adjusts the new set points. If the system response does not violate any equipment limits and/or has cleared all equipment limit violations, the controller 28 may determine that the HVDC system is operating nominally, or at least efficiently, in view of the steady-state disrupted condition.

The disclosed methods and systems may be used to control the operation of converter stations to bring a multi-terminal HVDC system into a stable operating point following a disruption to the DC grid, such as one involving the outage of cables, overhead lines, or converter stations. In some examples, the methods and systems set or adjust the real and reactive power orders or set points, which may include the DC voltage set points, based on the results of an optimal power flow technique that accounts for the losses in the converters. The inputs to the disclosed methods and systems may include the power injections to the AC system that are made by the remaining converter stations under the post-transient or post-contingency steady-state disrupted conditions.

Some examples of the systems and methods disclosed herein may provide and/or support coordinated control of multi-terminal HVDC systems, such as where the controller 28 is a central or wide area controller configured to control the HVDC system 20 based on measurements received from throughout the system. Use of a central controller to control the HVDC system based on measurements received from throughout the system, as opposed to local control of the plurality of converter stations based on local measurements, may allow for coordinated control of the converter stations and, correspondingly, of the HVDC system. In particular, the controller 28 may coordinate the operation of the converter stations 22 following a disruption or disturbance to the HVDC system, such as by simultaneously adjusting the real power, reactive power and/or DC voltage set points of a plurality of the converter stations, which may move the HVDC system toward a stable, feasible and/or economical operating point with voltages restored to their nominal values, power balance in the system, and without any equipment limit violations. When optimal power flow techniques are included, the controller 28 may coordinate the operation of the converter stations 22 following a disruption or disturbance to the HVDC system to move the HVDC system toward an optimal operating point in view of the disruption and equipment limits.

In some examples, at least some of the converter stations 22 may be configured to provide real-time monitoring of the Thevenin's impedance seen by the converter station such that the distribution of power among the converter stations considers or accounts for AC system strength.

Figure 5:
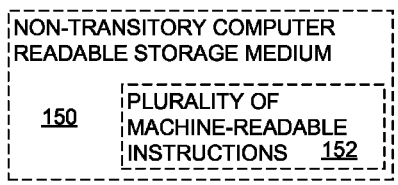
FIG. 5 is a nonexclusive illustrative example of a non-transitory computer readable storage medium having a plurality of machine-readable instructions stored thereon.
Figure 6:
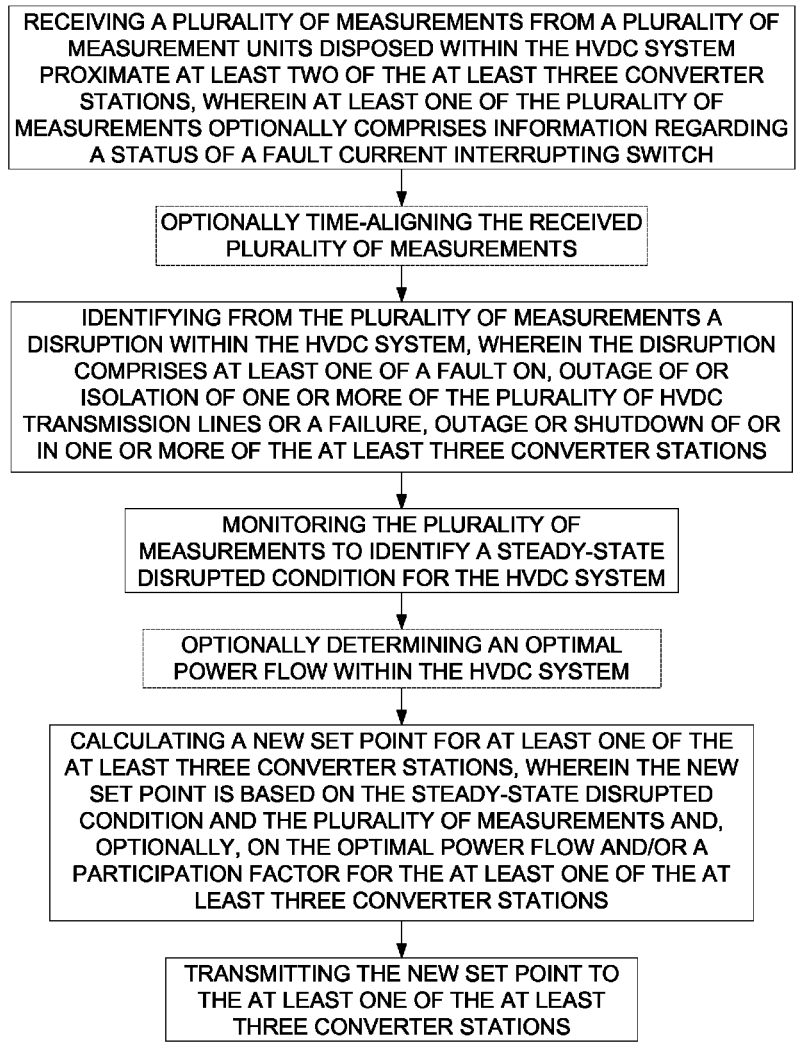
FIG. 6 is a flow chart of another nonexclusive illustrative example of a method for controlling a multi-terminal HVDC system having a plurality of converter stations, such as the HVDC system of FIG. 1.

The disclosed methods and systems may be embodied as or take the form of the methods and systems previously described, as well as of a transitory or non-transitory computer readable medium, such as the non-transitory computer readable storage medium 150 shown in FIG. 5, having computer-readable instructions, such as the plurality of machine-readable instructions 152 shown in FIG. 5, stored thereon which, when executed by a processor, carry out operations of the disclosed methods and systems. The computer-readable medium may be any medium that can contain, store, communicate, propagate, or transport the program instruction for use by or in connection with the instruction execution system, apparatus, or device and may, by way of example but without limitation, be an electronic, magnetic, optical, electromagnetic, infrared, or semiconductor system, apparatus, device, or propagation medium or other suitable medium upon which the program is recorded. More specific examples (a non-exhaustive list) of such a computer-readable medium may include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the disclosed methods and systems may be written in any suitable programming language provided it allows achieving the previously described technical results.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A method for controlling a multi-terminal HVDC system comprising at least three converter stations interconnected by a plurality of HVDC transmission lines, the method comprising:
   receiving a plurality of measurements from a plurality of measurement units disposed within the HVDC system proximate at least two of the at least three converter stations;
   identifying from the plurality of measurements a disruption within the HVDC system, wherein the disruption comprises at least one of: a fault on, outage of or isolation of one or more of the plurality of HVDC transmission lines or a failure, outage or shutdown of or in one or more of the at least three converter stations;
   monitoring the plurality of measurements to identify a steady-state disrupted condition for the HVDC system;
   calculating a new set point for at least one of the at least three converter stations, wherein the new set point is based on the steady-state disrupted condition and the plurality of measurements; and
   transmitting the new set point to the at least one of the at least three converter stations.

2. The method of claim 1, comprising:
   determining from the plurality of measurements a system response to the new set point; and
   determining whether the system response violates at least one equipment limit for the HVDC system.

3. The method of claim 1, wherein the HVDC system includes a fault current interrupting switch associated with at least one of the plurality of HVDC transmission lines and with at least one of the at least three converter stations, and at least one of the plurality of measurements comprises information regarding a status of the fault current interrupting switch.

4. The method of claim 1, wherein:
monitoring the plurality of measurements to identify the steady-state disrupted condition includes monitoring a power flow within the HVDC system and identifying the steady-state disrupted condition from the power flow; and
calculating the new set point comprises determining an optimal power flow within the HVDC system, and the new set point is based on the optimal power flow.

5. The method of claim 1, wherein the new set point is based on a participation factor for the at least one of the at least three converter stations.

6. The method of claim 1, comprising:
calculating a new set point for each of the at least three converter stations, wherein at least some of the new set points are based on the steady-state disrupted condition and the plurality of measurements; and
transmitting the new set points to corresponding ones of the at least three converter stations.

7. The method of claim 1, comprising time-aligning the received plurality of measurements.

8. The method of claim 4, wherein the optimal power flow is determined between at least two of the at least three converter stations.

9. The method of claim 4, wherein the optimal power flow is determined based on variable power losses in at least one of the at least three converter stations.

10. The method of claim 6, wherein each of the at least three converter stations has a participation factor, and at least some of the new set points are adjusted based on the participation factor for the corresponding one of the at least three converter stations.

11. A non-transitory computer readable storage medium having embodied thereon a plurality of machine-readable instructions configured to be executed by a computer processor to control a multi-terminal HVDC system that comprises at least three converter stations interconnected by a plurality of HVDC transmission lines, the plurality of machine-readable instructions comprising instructions to:
receive a plurality of measurements from a plurality of measurement units disposed within the HVDC system proximate at least two of the at least three converter stations;
identify from the plurality of measurements a disturbance within the HVDC system, wherein the disturbance comprises at least one of: a fault on, outage of or isolation of one or more of the plurality of HVDC transmission lines or a failure, outage or shutdown of or in one or more of the at least three converter stations;
monitor the plurality of measurements to identify a steady-state disturbed condition for the HVDC system;
calculate a new set point for at least one of the at least three converter stations, wherein the new set point is based on the steady-state disturbed condition and the plurality of measurements; and
transmit the new set point to the at least one of the at least three converter stations.

12. The non-transitory computer readable storage medium of claim 11, comprising instructions to:
determine from the plurality of measurements a system response to the new set point; and
determine whether the system response violates at least one equipment limit for the HVDC system.

13. The non-transitory computer readable storage medium of claim 11, wherein the HVDC system includes a fault current interrupting switch associated with at least one of the plurality of HVDC transmission lines and with at least one of the at least three converter stations, and at least one of the plurality of measurements comprises information regarding a status of the fault current interrupting switch.

14. The non-transitory computer readable storage medium of claim 11, wherein:
the plurality of measurements include a power flow;
the instructions to monitor the plurality of measurements to identify the steady-state disturbed condition include instructions to monitor the power flow and instructions to identify the steady-state disturbed condition based on the power flow; and
the instructions to calculate the new set point include instructions to determine an optimal power flow within the HVDC system, and the new set point is based on the optimal power flow.

15. The non-transitory computer readable storage medium of claim 11, wherein the new set point is based on a participation factor for the at least one of the at least three converter stations.

16. The non-transitory computer readable storage medium of claim 11, comprising instructions to:
calculate a new set point for each of the at least three converter stations, wherein at least some of the new set points are based on the steady-state disturbed condition and the plurality of measurements; and
transmit the new set points to corresponding ones of the at least three converter stations.

17. The non-transitory computer readable storage medium of claim 14, wherein the optimal power flow is determined through at least one of the at least three converter stations.

18. The non-transitory computer readable storage medium of claim 16, wherein each of the at least three converter stations has a participation factor, and at least some of the new set points are adjusted based on the participation factor for the corresponding one of the at least three converter stations.

19. A multi-terminal HVDC system, comprising:
at least three converter stations each having a DC side;
an HVDC grid interconnecting the DC sides of the at least three converter stations, wherein the HVDC grid comprises a plurality of HVDC transmission lines;
a plurality of measurement units disposed within the HVDC system proximate at least two of the at least three converter stations, wherein the plurality of measurement units are configured to obtain a plurality of time-tagged measurements from the HVDC system; and
a controller communicatively linked to the plurality of measurement units and the at least three converter stations, wherein the controller is configured to execute instructions to:
receive the plurality of measurements from the plurality of measurement units;
identify from the plurality of measurements an outage within the HVDC system, wherein the outage comprises at least one of: a fault on, outage of or isolation of one or more of the plurality of HVDC transmission lines or a failure, outage or shutdown of or in one or more of the at least three converter stations;
monitor the plurality of measurements to identify a steady-state outaged condition for the HVDC system;
calculate a new set point for at least one of the at least three converter stations, wherein the new set point is based on the steady-state outaged condition and the plurality of measurements; and
transmit the new set point to the at least one of the at least three converter stations.

20. The system of claim 19, wherein controller is configured to execute instructions to:
- determine from the plurality of measurements a system response to the new set point; and
- determine whether the system response violates at least one equipment limit for the HVDC system.

21. The system of claim 19, wherein the HVDC system includes a fault current interrupting switch associated with at least one of the plurality of HVDC transmission lines and with at least one of the at least three converter stations, and at least one of the plurality of measurements comprises information regarding a status of the fault current interrupting switch.

22. The system of claim 19, wherein:
- the instructions to monitor the plurality of measurements to identify the steady-state outaged condition include instructions to monitor a power flow within the HVDC system and instructions to identify the steady-state outaged condition based on the power flow; and
- the instructions to calculate the new set point include instructions to determine an optimal power flow within the HVDC system, and the new set point is based on the optimal power flow.

23. The system of claim 19, wherein the new set point is based on a participation factor for the at least one of the at least three converter stations.

24. The system of claim 19, wherein controller is configured to execute instructions to:
- calculate a new set point for each of the at least three converter stations; and
- transmit the new set points to corresponding ones of the at least three converter stations, wherein each of the at least three converter stations has a participation factor, and at least some of the new set points are adjusted based on the participation factor for the corresponding one of the at least three converter stations.

25. The system of claim 19, wherein at least some of the at least three converter stations comprise a voltage source converter.

26. The system of claim 22, wherein the optimal power flow is determined within the HVDC grid.

* * * * *